Aug. 26, 1958 — E. J. HAEDIKE ET AL — 2,848,990
GAS-FIRED GRILL AND BROILING METHOD
Filed Jan. 30, 1956 — 3 Sheets-Sheet 1

Inventors
EDWARD J. HAEDIKE
STEVE ZAVODNY
by Hill, Sherman, Meroni, Gross & Simpson Attys.

Aug. 26, 1958     E. J. HAEDIKE ET AL     2,848,990
GAS-FIRED GRILL AND BROILING METHOD
Filed Jan. 30, 1956     3 Sheets-Sheet 2
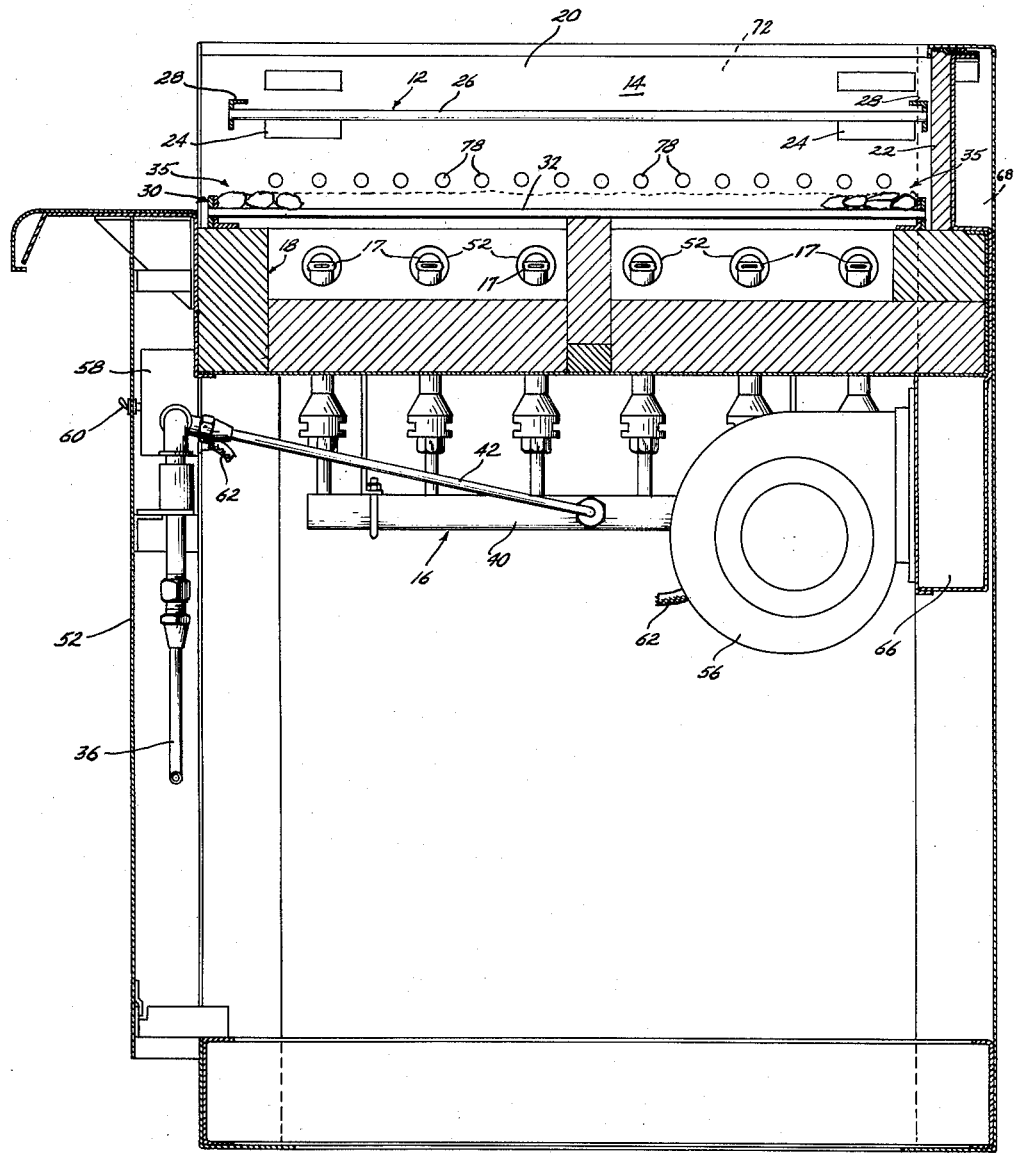
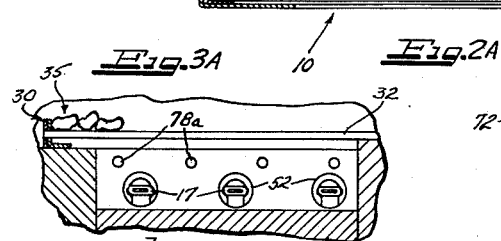
Inventors
EDWARD J. HAEDIKE
STEVE ZAVODNY

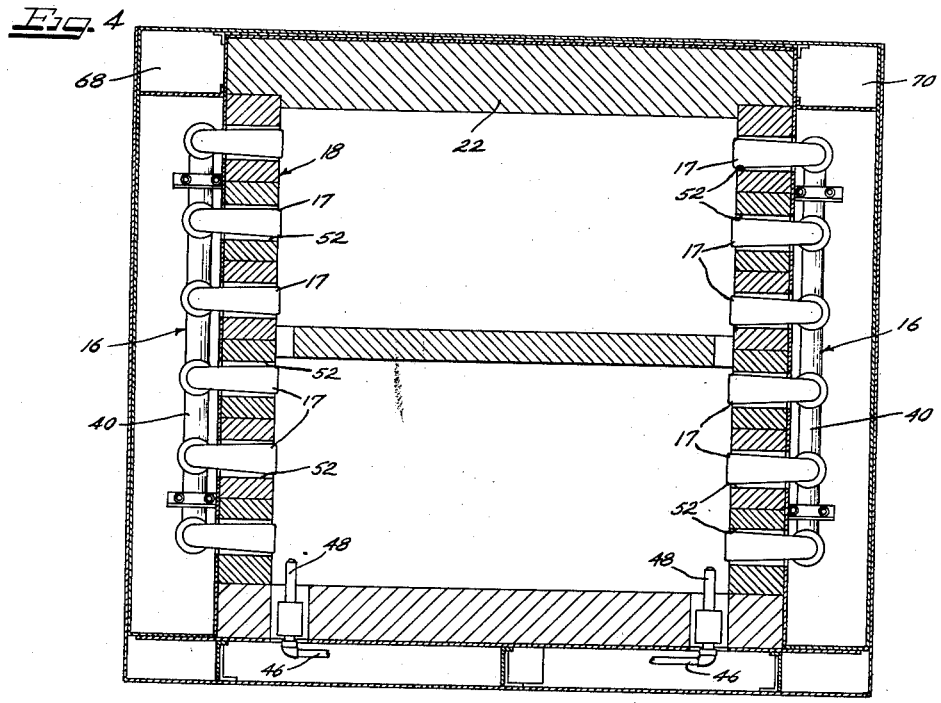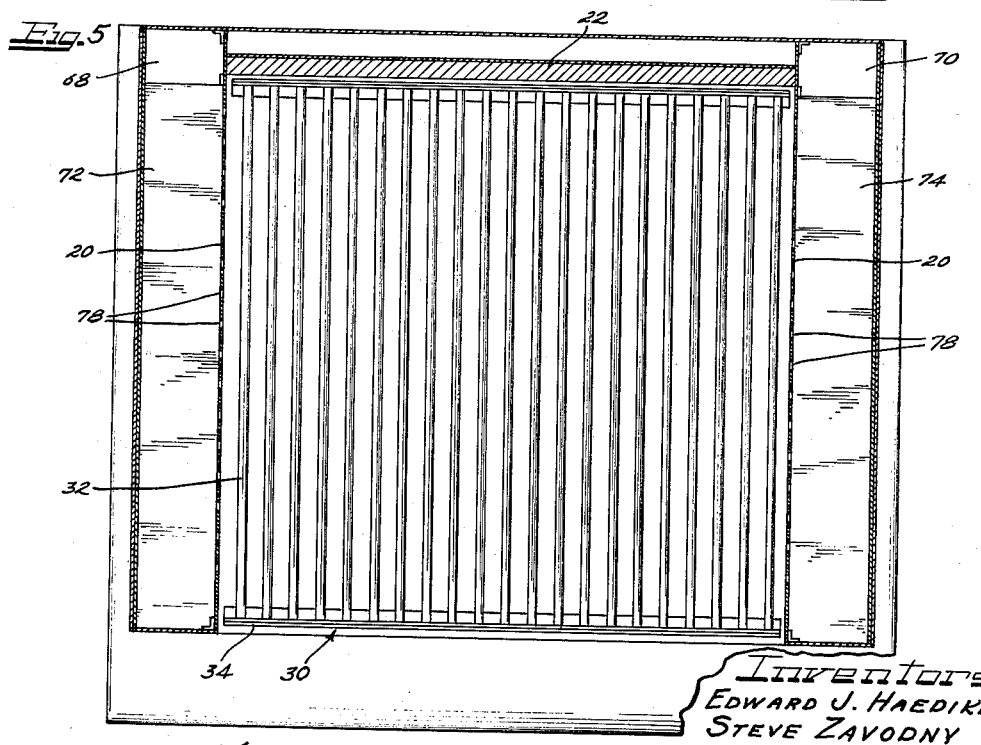

United States Patent Office 2,848,990
Patented Aug. 26, 1958

2,848,990

GAS-FIRED GRILL AND BROILING METHOD

Edward J. Haedike, Chicago, and Steve Zavodny, Barrington, Ill., assignors to Mid-Continent Metal Products Company, Chicago, Ill., a corporation of Illinois Application January 30, 1956, Serial No. 562,304

7 Claims. (Cl. 126—41)

This invention relates generally to cooking stoves or ranges, and to broiling methods, and more particularly to gas-fired grills and the like providing open-hearth type broiling means.

An object of the present invention is the provision of such a range of new and improved construction.

Another object is to provide such a range having improved means for regulating the flame and combustion effects incident to broiling operations.

A further object is to provide a broiling method providing control of the combustion of melted fat and the like which drips from the meat onto the heating means.

These and other objects, features, and advantages of the present invention will be readily apparent from the following description of illustrative embodiments thereof, taken in conjunction with the accompanying drawings, in which:

Figure 2A is a detail view generally similar to a fragmental portion of Figure 2, but illustrating an alternative embodiment;

Figure 3 is a vertical, longitudinal sectional view taken substantially along the line III—III of Figure 1;

Figure 3A is a detail view generally similar to a fragmental portion of Figure 3, but illustrating the embodiment of Figure 2A;

Figure 4 is a horizontal sectional view taken generally along the line IV—IV of Figure 2; and Figure 5 is a horizontal sectional view taken generally along the line V—V of Figure 2.

Figure 2:
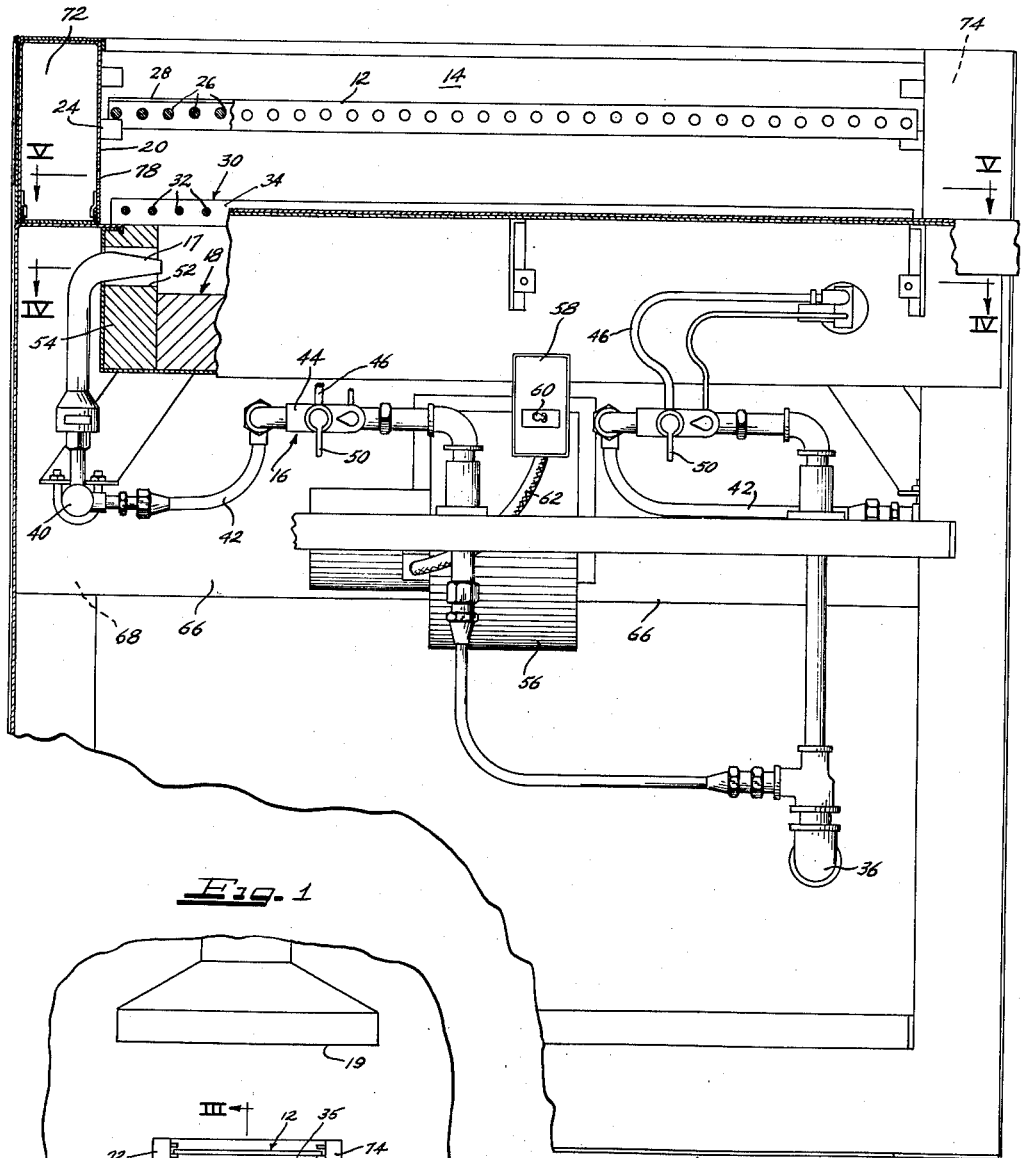
Figure 2 is an enlarged, vertical sectional view thereof, the front panel being removed to show interior details and features, and with certain features broken away and shown in section for clarity of presentation.
Figure 1:
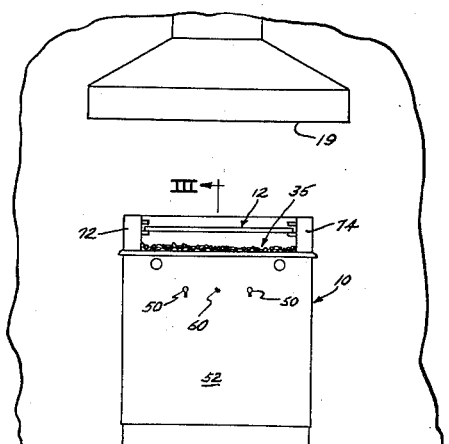
Figure 1 is a front elevational view of a grill embodying the present invention.

By way of example, an open-hearth cooking range 10 having a food-supporting rack or grill 12 supported in a cooking chamber 14 heated by gaseous fuel by gas-supply means 16 has been chosen to illustrate the invention. The gas burners or nozzles 17 of the gas supply means are located in an insulated chamber or hearth 18 formed of suitable refractory material, such as fire brick, burner tile, or the like. Such a range is desirably provided with an exhaust canopy or hood 19 adapted by blower means (not shown) to exhaust the air and smoke from the cooking chamber.

As shown, the cooking chamber 14 is enclosed at its side by side walls 20 and at its rear by a rear wall 22, the latter being desirably of suitable refractory material. The front and the top of the cooking chamber 14 are desirably open.

The grill 12 is shown as an open-mesh grid or series of metal bars 26 secured as by welding to connecting bars 28 shown as formed of angle iron, and supported by brackets 24 secured to the side walls 20.

Below the grill 12, the cooking chamber 14 is shown as provided with a grate 30. The grate 30 shown is formed from metal bars 32 and angle irons 34 generally the same as the grill 12, with the spacing of the bars 32 being close enough to support a bed 35 of material such as black refractory lumps, briquettes, chips, or the like which simulate coal or charcoal and become incandescent under heat. Suitable refractory material includes black chrome ore, fire brick, or the like.

For heating the material on the grate 30 the fuel supply means 16 is provided. As shown, the fuel supply means 16 leads from a gas inlet 36 to provide a branched conduit arrangement leading to generally identical right-hand and left-hand series of gas jets or nozzles 17. Each series of the gas nozzles 17 is supplied from an associated manifold member or header 40 supplied with gas through a conduit 42. In each conduit 42 there is shown control valve means 44 adapted to regulate the flow of gas to the nozzles 17, and having auxiliary gas-ignition means such as a pilot conduit 46 extending therefrom to an associated pilot nozzle 48 adjacent one of the gas nozzles 17. The nozzles are desirably generally flattened, as shown, thereby to shoot a wide flame to provide positive ignition of adjacent gas jets.

To provide the desired manual regulation of the gas supply, knobs or operating handles 50 are provided for the controls 44 to extend forwardly through a front panel 52 of the grill structure.

The gas nozzles 17 are mounted so that they extend through suitable openings 52 provided in the side walls 54 of the grill hearth 18, with the axis of the tip of the gas nozzles 17 horizontal. Thus, with the gas supplied to the gas nozzles 17 and ignited, as the jets of gas flames heat the bed of briquettes 35 on the grate 30 to cause them to glow and serve as a generally uniformly distributed heating means to heat the grill 12 and meat thereon. Meat products such as melted fat, grease, and the like from meat placed upon the grill 12 drip upon the glowing bed to cause flames to be shot upward against the meat to give it an attractive charred appearance and flavor.

According to a feature of the present invention, means are provided to supply a forced stream of air to control the cooking operation, particularly to control the combustion of the drippings. As shown, such means includes a blower 56 (Figures 2 and 3), electrically driven and controlled as by a blower switch 58 mounted so that the actuating member 60 of switch 58 extends through the front panel 52 at the front of the range. An electric conduit 62 connects the switch with the blower.

The blower 56 delivers air rearwardly through a transversely extending duct 66 which communicates at the left-hand and right-hand sides respectively of the range structure with vertically extending ducts 68—70 (Figure 4).

Those vertically extending ducts 68—70 in turn communicate with longitudinally extending ducts 72—74 (Figures 2 and 5) at the sides of the device. As shown, the opposed walls of the ducts 72 and 74 are provided by the side walls 20 of the cooking chamber.

The ducts 72 and 74 extend longitudinally of the range and provide manifolds or headers for air to be supplied above the bed of material 35 on the grate 30. To provide the desired outlet from the ducts 72 and 74 for that purpose, their opposed walls 20 are provided with outlets 78 such as the opening shown which extend in a series desirably longitudinally the full depth of the cooking chamber.

Thus, auxiliary air is supplied in the form of a series of air jets which provide a wide thin current or longitudinally extending stream of air to control the combustion of the meat products dripping onto the glowing ember bed 35.

While the arrangement shown in Figures 2, 3, and 5 shows the air openings or outlets 78 above the grate 30, corresponding outlets or openings may be provided below the grate 30, as indicated in Figures 2A and 3A. As there shown, the side walls 54 of the hearth are provided with openings 78a extending from the header duct 5 to discharge air streams below the grate to blow past 72 the grate and control combustion generally by removing air in or around the grate as set forth above.

A range or the like constructed in accordance with the present invention provides an open-hearth type broiler having desirable operating characteristics. The gas provides a controllable flame to heat the charcoal-like ember bed on the grate. Melted fat and grease products from meat placed upon the grill drip downward onto the ember bed and are there ignited and burned to give a charred characteristic appearance and flavor to the meat. The jets of air supplied through the outlets 78 and 78a control the combustion, particularly of those meat product drippings to regulate the flame and smoke to give the desired charred effect.

It will thus be seen from the foregoing description of our invention according to these illustrative embodiments, considered in conjunction with the accompanying drawings, that the present invention provides a new and improved gas-fired grill and broiling method having the desired advantages and characteristics, and accomplishing its intended objects, including those hereinbefore pointed out and others which are inherent in the invention as described.

It will be understood that modifications and variations may be effected without departing from the scope of the novel concepts of the present invention.

We claim as our invention:

1. A cooking range, comprising a horizontally arranged food grill, a horizontally arranged grate, supported in spaced relation below said grill, a bed of non-burning material upon said grate, an adjustable gas burner means carried below said grate to heat it and the non-burning material carried thereby, said gas burner means comprising a plurality of nozzles mounted in the side walls of the range with the nozzles extending horizontally therefrom, means cooperating with the side walls of said range to provide horizontal longitudinal ducts, one wall of each of said ducts facing the chamber between said grill and grate, means to supply air under pressure to said duct, said duct wall being provided with a horizontal longitudinally extending series of openings providing horizontal outlets from said duct to provide that air in said duct will be forced into a series of air jets directed horizontally and transversely of the range adjacent the bed of non-burning material between the grate and grill above said gas burners to control flames between said grate and said grill without changing the adjustable gas burner means.

2. An open hearth type broiler comprising a grate, said grate supporting a bed of refractory material, said material adapted to be heatable to incandescence, a grill supported above said grate, gas burner means comprising a plurality of nozzles supported below said grate and said bed of refractory material and adapted to heat the same, and means for forcibly blowing a plurality of jets of air horizontally and transversely of the broiler and adjacent said bed of refractory material and below said grill to control flames extending between said refractory material and said grill without changing the gas burner means.

3. A broiler comprising a cooking chamber within vertical walls, a hearth below said cooking chamber, a generally horizontal open grill in said chamber for supporting food to be broiled, said grill supported by the walls of said chamber, a generally horizontal open grate spaced below said grill and supported by said hearth, a bed of refractory material lumps supported on said grate, gas burner means for heating said grate and said lumps, air blast means for directing a plurality of jets of air adjacent said bed transversely between the grill and said lumps, and a manual control member for selectively controlling said air blast means and the jets of air discharged therefrom for controlling flames between said grill and said lumps created by the combustion of drippings falling onto said lumps from food products supported on said grill without changing the gas burner means.

4. An open hearth broiler, comprising a cooking chamber with vertical walls, a hearth below said chamber, a grate horizontally supported by said hearth adapted to contain a bed of refractory material, a bed of refractory material upon said grate, adjustable means below said grate to heat said grate and said material, a grill above said grate horizontally supported by the side walls of the cooking chamber for supporting food to be broiled, a plurality of openings in the side walls of said chamber, an air blower, and manually operable control means for selectively controlling said air blower for forcibly blowing air to said plurality of openings in the side walls of said chamber thereby blowing a plurality of jets of air transversely of the broiler over said bed of refractory material and below said grill for controlling flames below said grill created by drippings from food products on said grill without affecting the adjustable means for heating the refractory material.

5. A simulated charcoal broiler free from charcoal which comprises an open hearth cooking range, an open food supporting grill carried by said range, an open rack carried by said range in spaced relation below said grill, a bed of charcoal simulating lumps of refractory material on said rack, gas burners supported by said range for projecting live gas flames below said rack to heat the bed of lumps to broiling temperatures, said bed of heated lumps receiving fat drippings from food being broiled on the grill to create smoke adapted to envelop the food on the grill, air conduit means supported by said range having outlets for directing streams of air across the range at a level adjacent said bed and between the bed and grill to control the smoke, and manually operated valve means for controlling flow of air from said outlets.

6. A cooking range comprising a cooking chamber embodying side walls, a hearth below said cooking chamber, a food grill in said chamber and supported thereby, a grate supported by said hearth below said grill in spaced relation to said grill, a bed of non-combustible material on said grate under said grill, adjustable gas burner means below said grate and positioned to heat the non-burning material carried by the grate, and means for forcibly blowing jets of air transversely of the chamber only above the gas burner means and below the grill and adjacent the top of the bed of non-combustible material for controlling flames below said grill without changing the adjustable gas burner means.

7. A broiler which comprises an open food grill, an open grate in spaced relation below said grill, a bed of non-burning refractory material lumps between the grate and grill, gas burner means below the grill acting on said lumps below the top of said bed to supply heat for food or the like deposited on said grill, air blower means for directing a stream of air adjacent the bed between the lumps and the grill to control flames and smoke issuing from the lumps during broiling, means for selectively actuating said air blower means, means for adjusting said gas burner means, and said air blower means controlling said smoke and flames independently of said gas burner means.

References Cited in the file of this patent

UNITED STATES PATENTS

| | | |
|---|---|---|
| 898,814 | Zehring | Sept. 15, 1908 |
| 2,140,163 | McKee | Dec. 13, 1938 |
| 2,199,584 | Bemis | May 7, 1940 |
| 2,542,335 | Kapit et al. | Feb. 20, 1951 |
| 2,638,888 | Molla | May 19, 1953 |
| 2,720,827 | Del Francia | Oct. 18, 1955 |